United States Patent
Bottari et al.

(10) Patent No.: US 10,469,219 B2
(45) Date of Patent: Nov. 5, 2019

(54) VIRTUALIZATION SYSTEM

(71) Applicant: Telefonaktiebolaget LM Ericsson (publ), Stockholm (SE)

(72) Inventors: Giulio Bottari, Pisa (IT); Paola Iovanna, Pisa (IT); Filippo Ponzini, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 53 days.

(21) Appl. No.: 15/510,197

(22) PCT Filed: Sep. 17, 2014

(86) PCT No.: PCT/EP2014/069827
§ 371 (c)(1),
(2) Date: Mar. 9, 2017

(87) PCT Pub. No.: WO2016/041595
PCT Pub. Date: Mar. 24, 2016

(65) Prior Publication Data
US 2017/0310437 A1 Oct. 26, 2017

(51) Int. Cl.
*H04L 12/26* (2006.01)
*H04L 5/00* (2006.01)
(Continued)

(52) U.S. Cl.
CPC ........... *H04L 5/0032* (2013.01); *H04W 16/10* (2013.01); *H04W 24/02* (2013.01);
(Continued)

(58) Field of Classification Search
USPC ................. 370/252, 254, 328, 329
See application file for complete search history.

(56) References Cited

U.S. PATENT DOCUMENTS 6,985,937 B1 * 1/2006 Keshav ............ G06F 9/505
370/231
8,719,415 B1 * 5/2014 Sirota ............... G06F 9/5061
709/221
(Continued)

FOREIGN PATENT DOCUMENTS

EP 2635087 9/2013

OTHER PUBLICATIONS

International Search Report for International application No. PCT/EP2014/069827—May 21, 2015.
(Continued)

*Primary Examiner* — Kwang B Yao
*Assistant Examiner* — Nguyen H Ngo
(74) *Attorney, Agent, or Firm* — Sage Patent Group (57) ABSTRACT

A virtualization system (1) comprising a baseband processing arrangement (11,12). The virtualization system is configured to provide a plurality of virtual machines (41,42), each virtual machine having an allocation of baseband processing capacity provided by the baseband processing arrangement for serving remote radio units (6). The virtualization system is configured to dynamically re-allocate baseband processing capacity between virtual machines (41,42) based on at least one parameter related to radio domain requirements of the remote radio units (6).

10 Claims, 10 Drawing Sheets (51) Int. Cl.
*H04W 16/10* (2009.01)
*H04W 28/02* (2009.01)
*H04W 72/04* (2009.01)
*H04W 24/02* (2009.01)
*H04W 88/08* (2009.01)

(52) U.S. Cl.
CPC ..... *H04W 28/0252* (2013.01); *H04W 72/048* (2013.01); *H04W 88/085* (2013.01)

(56) References Cited

U.S. PATENT DOCUMENTS

| | | | | |
|---|---|---|---|---|
| 2009/0006710 | A1* | 1/2009 | Daniel | G06F 9/45558 710/315 |
| 2011/0125905 | A1 | 5/2011 | Baucke et al. | |
| 2011/0302390 | A1* | 12/2011 | Copeland | G06F 9/5061 712/2 |
| 2012/0210066 | A1* | 8/2012 | Joshi | G06F 12/0866 711/118 |
| 2013/0281049 | A1 | 10/2013 | Lee et al. | |
| 2014/0032761 | A1* | 1/2014 | Beveridge | G06F 9/5011 709/226 |
| 2014/0181807 | A1* | 6/2014 | Fonseca | G06F 9/5083 718/1 |
| 2014/0196033 | A1* | 7/2014 | Bobroff | G06F 9/45558 718/1 |
| 2014/0258446 | A1* | 9/2014 | Bursell | G06F 15/177 709/217 |
| 2015/0023278 | A1* | 1/2015 | Boccardi | H04L 25/0224 370/329 |
| 2015/0278513 | A1* | 10/2015 | Krasin | G06F 9/5005 726/30 |

OTHER PUBLICATIONS

Network Functions Virtualisation; An Introduction, Benefits, Enablers, Challenges & Call for Action; Introductory White Paper; Issue 1—Oct. 2012.

Ericsson Heterogeneous Networks Handbook; Rev A.—Mar. 23, 2013.

Ericsson Review, The communications technology journal since 1924; Virtualizing network services—the telecom cloud—Mar. 28, 2014.

* cited by examiner

VIRTUALIZATION SYSTEM

PRIORITY

This nonprovisional application is a U.S. National Stage Filing under 35 U.S.C. § 371 of International Patent Application Serial No. PCT/EP2014/069827 filed Sep. 17, 2014, and entitled "Virtualization System."

TECHNICAL FIELD

Embodiments herein relate to a virtualization system, a digital unit, network and method for operating a virtualization system.

BACKGROUND

In heterogeneous networks, and in a future 5G scenario, small cell deployment benefits from coordination across all cells located in the same area. The performance improvement is achieved through spectrum reuse between small and macro cells, so that macro spectrum can be fully reused by small cells. This allows the same services to be delivered using less spectrum width. Coordination also involves cell selection and interference management, in particular at the cell edges.

A tight coordination enables advanced techniques such as:

1) Coordinated multi-point (CoMP). Signals are sent to users from multiple points 2) Coordinated link adaptation. Base stations estimate radio quality between terminals and exchange scheduling decisions 3) Coordination scheduling. Instead of each cell's scheduler operating independently, scheduling is based on the tightest possible coordination between base stations Tight coordination is possible if the baseband processing of traffic, originated by multiple cells, is centralized in a common site. By running baseband processing in a common site, it is also possible to share computational resources, for example dedicating more computational effort to heavy loaded cells or to manage "cell edge" conditions for user located at the borders among coordinated cells.

Figure 1:
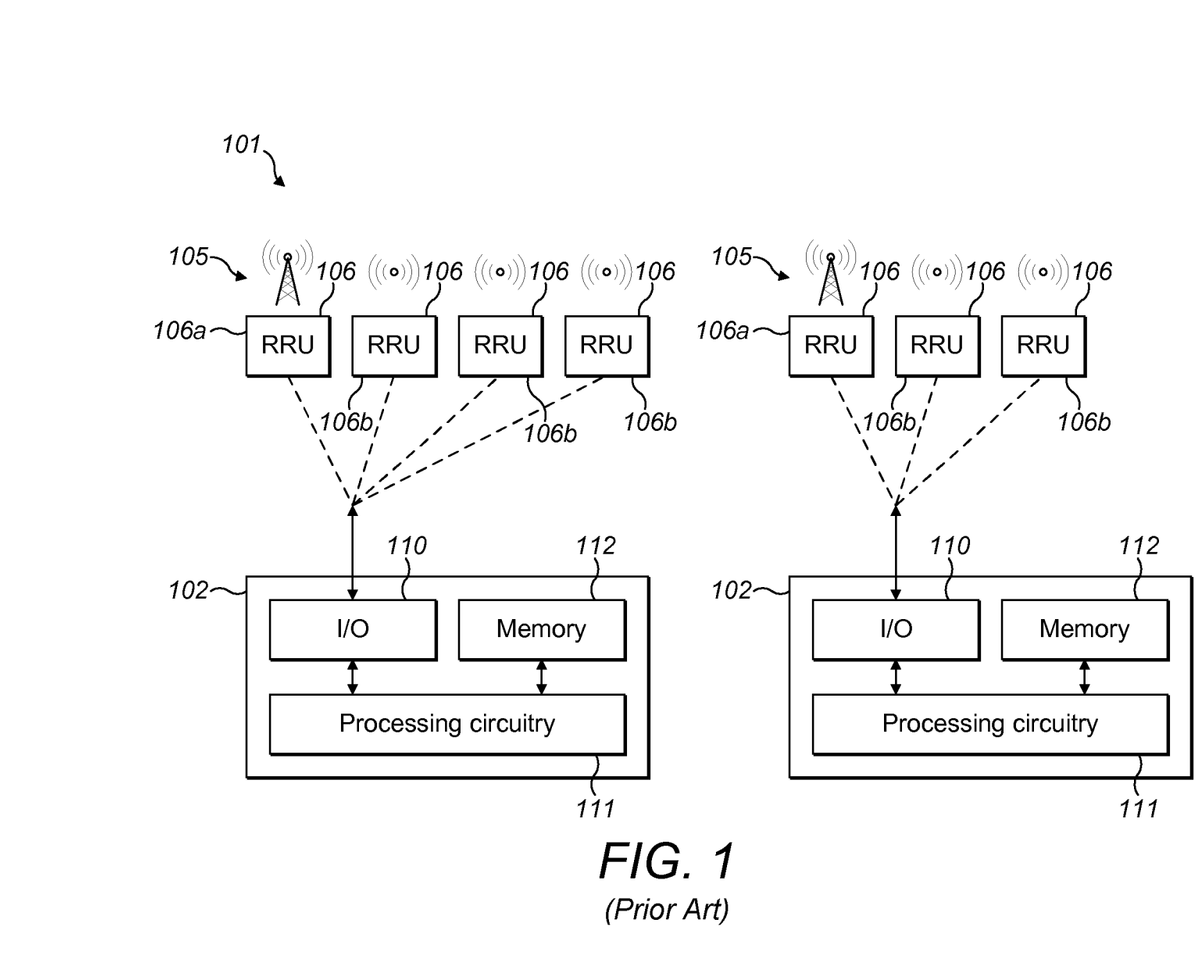
FIG. 1 is a schematic overview depicting a prior art network.

FIG. 1 illustrates a conventional centralized network 101. The network 101 comprises two Digital Units (DU) 102, each DU 102 dedicated to serve a group 105 of a plurality of Remote Radio Units (RRU) 106. Each RRU 106 is connected with a DU 102 which reserves a given amount of its processing capability to the RRU itself. The total DU 102 capability is typically dimensioned on the peak of the traffic of the served RRU group 105, to avoid blocking conditions. In this example, each group of RRUs comprises one RRU 106a managing a macro cell, and one or more RRUs 106b managing small cells. Each DU 102 has an I/O port 110, processing circuitry 111 and a memory 112, in order to carry out baseband processing and communicate with the RRUs 102.

The RRUs 106, serving cells among which tight coordination is desired, have their baseband signals processed by the same DU 102. DUs 102 are typically designed for worst-case peak loads. However, typical workload levels are much lower than the peak loads and therefore the excess capacity is not used. For example, in heterogeneous networks in particular, RRUs managing small cells can be switched on/off according to current needs. Thus, the number/type/location of cells which require mutual coordination at DU 102 may fluctuate.

In addition, hand-over procedure is always dependent on the capacity of the target radio-base station to serve the new user. If the new user is accepted, context information has to be sent to the new cell, increasing the network overhead.

The need for coordination will become more and more demanding as the mobile network evolves towards 5G. The shortage of spectrum, the increased number of small cells and the huge number of devices moving in geographical area will require a tight coordination.

SUMMARY

In a first aspect of the invention, there is provided a virtualization system comprising a baseband processing arrangement. The virtualization system is configured to provide a plurality of virtual machines, each virtual machine having an allocation of baseband processing capacity provided by the baseband processing arrangement for serving remote radio units. The virtualization system is configured to dynamically re-allocate baseband processing capacity between virtual machines based on at least one parameter related to radio domain requirements of the remote radio units.

Thus, the baseband processing capacity allocated to a virtual machine functioning as a digital unit may be varied according to radio requirements.

Optionally, the virtualization system is configured to de-allocate baseband processing capacity which is determined to be unused from one or more of the plurality of virtual machines. The virtualization system is configured to allocate the de-allocated baseband processing capacity to an existing or additional virtual machine.

Optionally, the at least one parameter is based on one or more of: statistical baseband resource utilisation for one or more remote radio units, number of user equipments served by one or more remote radio unit, estimated average or peak traffic load handled by one or more remote radio unit, number of antennas related to a cell provided by one or more remote radio units, and level of coordination among the remote radio units.

Optionally, at least one of the virtual machines provides processing capacity for coordination of a plurality of coordinated remote radio units.

Optionally, the virtualization system is configured to vary a level of coordination among the remote radio units served by an existing or additional virtual machine, such that a baseband processing capacity required by the virtual machine is within an available baseband processing capacity to be allocated to the virtual machine.

In a second aspect of the invention, there is provided a digital unit configured to serve one or more remote radio units with a baseband processing capacity. The baseband processing capacity is a virtualized allocation of a part of a baseband processing arrangement. The digital unit is configured to dynamically release or receive baseband processing capacity to or from other virtualized allocations of the baseband processing arrangement, based on at least one parameter related to radio domain requirements of the one or more remote radio unit.

In a third aspect of the invention, there is provided a network comprising one or more virtualization system and a plurality of remote radio units. The or each virtualization system comprises a baseband processing arrangement. The virtualization system is configured to provide a plurality of virtual machines, each having an allocation of baseband processing capacity provided by the baseband processing arrangement for serving the remote radio units. The network is configured to dynamically re-allocate baseband processing capacity between virtual machines based on at least one parameter related to radio domain requirements of the remote radio units.

In a fourth aspect of the invention, there is provided a method of operating a virtualization system comprising a baseband processing arrangement. The method comprising providing a plurality of virtual machines, each having an allocation of baseband processing capacity provided by the baseband processing arrangement for serving remote radio units. The method further comprising dynamically re-allocating the processing capacity between virtual machines based on at least one parameter related to radio domain requirements of the remote radio units.

In a further aspect of the invention, there is provided a computer program product configured to implement the method of any example of the invention.

BRIEF DESCRIPTION OF THE DRAWINGS

Embodiments will now be described by way of example only in relation to the enclosed drawings, in which.

DETAILED DESCRIPTION

An aspects of the present invention relates to a method for providing virtual digital units, in a virtualization system, to support baseband processing of a plurality of remote radio units. By processing said plurality of remote radio units at the same virtual computational entity, it is possible to support tight radio coordination and to achieve optimized spectrum reuse and interference mitigation. The use of virtualized digital units allows dedicating just the needed amount of computational resources, to meet the current workload levels. It also facilitates the attachment/detachment of small cells to a coordinated pool of macro/small cells.

Figure 2:
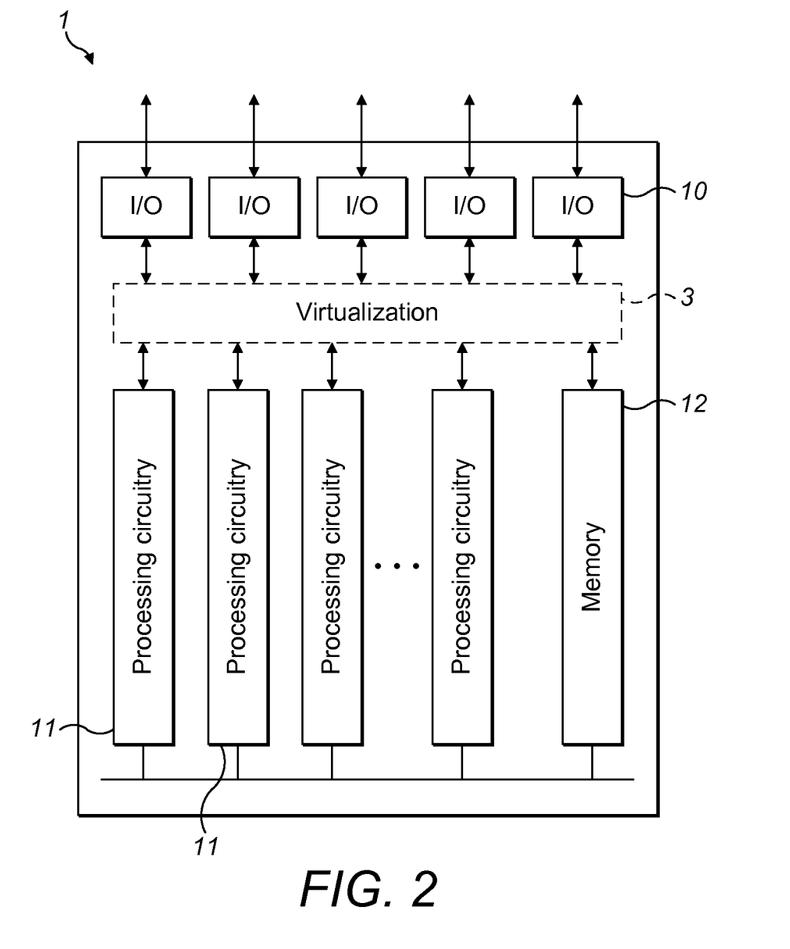
FIG. 2 is a schematic overview depicting a virtualisation system according to an example of the invention.

FIG. 2 illustrates a schematic block scheme of virtualization system 1 providing a plurality of Virtualized Digital Units (VDU). A VDU may be considered as equivalent in function to a conventional digital unit 10, implemented as a part of the virtualization system 1.

Virtualization refers to the use of a single physical server (e.g. virtualization system 1) to run many virtual machines. A plurality of independent computational instances can be activated (and inactivated) according to demands. Such virtual machines can also be dynamically adapted, in terms of computational capability, to follow evolving processing needs. Aspects of the invention may be considered as Network Functions Virtualization (NFV). The NFV paradigm proposes using IT virtualization related technologies, to virtualize entire classes of network node functions into building blocks that may be connected, or chained, together to create communication services.

In some aspects, the virtualization system 1 is a server machine, comprising a baseband processing arrangement. The baseband processing arrangement provides computational capacity in order to process baseband data from/to remote radio units. The baseband processing arrangement comprises one or more processing units 11 and memory 12, and optionally a storage area. In some examples, the one or more processing units 11 share a common memory 12, and optionally a common storage area. The virtualization system 1 hosts a platform virtualization environment able to present, through I/O ports 10, a set of "computational slices". Each VDU is associated with one I/O port 10. Each I/O port 10 is configured to communicate with one or more RRU. One I/O port 10 corresponds to one I/O port 110, of one digital unit 102. The virtualization system 1 comprises a plurality of I/O ports. The virtualization system 1 comprises processing resources for virtualization of a plurality of digital units, each digital unit supporting one or more RRU. In some aspects, each VDU may be considered to be a virtual machine. Each virtual machine has the baseband processing capacity of a digital unit to serve one or more RRUs.

The virtualization system 1 comprises a virtualization element 3 configured to control the virtualization, connecting the I/O ports 10, processing units 11 and memory 12. The instances of computational capabilities of the virtualization system 1 are configured to carry out the typical tasks of a conventional DU with a VDU. In other words, VDUs are configured to handle processing baseband traffic coming from a group or pool of one or more associated RRUs.

The group or pool of RRUs are coordinated. The VDU can serve coordination more efficiently than a conventional DU. Aspects of the invention may be considered to provide efficient cell coordination.

The VDU is compliant with a number of radio access technologies such as LTE, LTE-Advanced, WCDMA, GSM/EDGE, WiMax, or UMB, to mention a few possible implementations.

Figure 3:
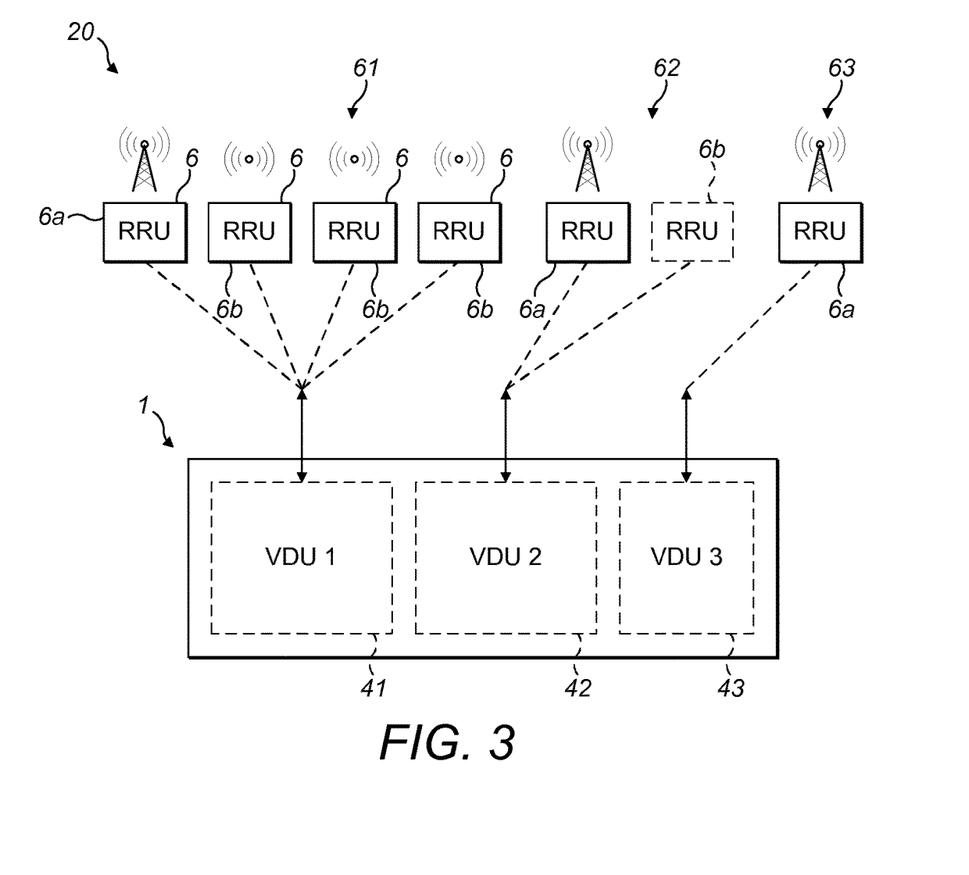
FIG. 3 is a schematic overview depicting a network according to an example of the invention.

FIG. 3 shows an example network 20 comprising a virtualization system 1 and a plurality of RRUs 6.

The virtualization system 1 is configured to function as a plurality of digital units. The virtualization system 1 provides virtualized processing resources, which may be flexibly allocated between the digital units (i.e. between the VDUs). Each VDU handles one or more RRU. In some examples, a plurality of the VDUs relate to cells in different geographical areas.

In some examples, the RRUs provide a plurality of different size cells. For example, a RRU may provide a macro cell (large cell) or a microcell, picocell, femtocell (small cell). The network 20 comprising a plurality of different cell sizes may be considered a heterogenous network. In some examples, a particular VDU is connected to a plurality of RRUs providing cells of different sizes.

In this example, the virtualization system is used to activate three VDUs 41,42,43. A first VDU 41, is in charge of baseband processing of a first pool 61 of RRUs 6 providing four coordinated cells, a macro cell 6a and three associated small cells 6b. This pool of RRUs covers a first area. A second VDU 42, is associated with a second pool 62 of RRUs 6a,6b providing a macro cell and with a small cell which is currently not active. This second pool 62 of RRUs covers a second area. A third VDU 43, is associated with a macro cell 6*a* of a which covers a third area 63.

Figure 4:
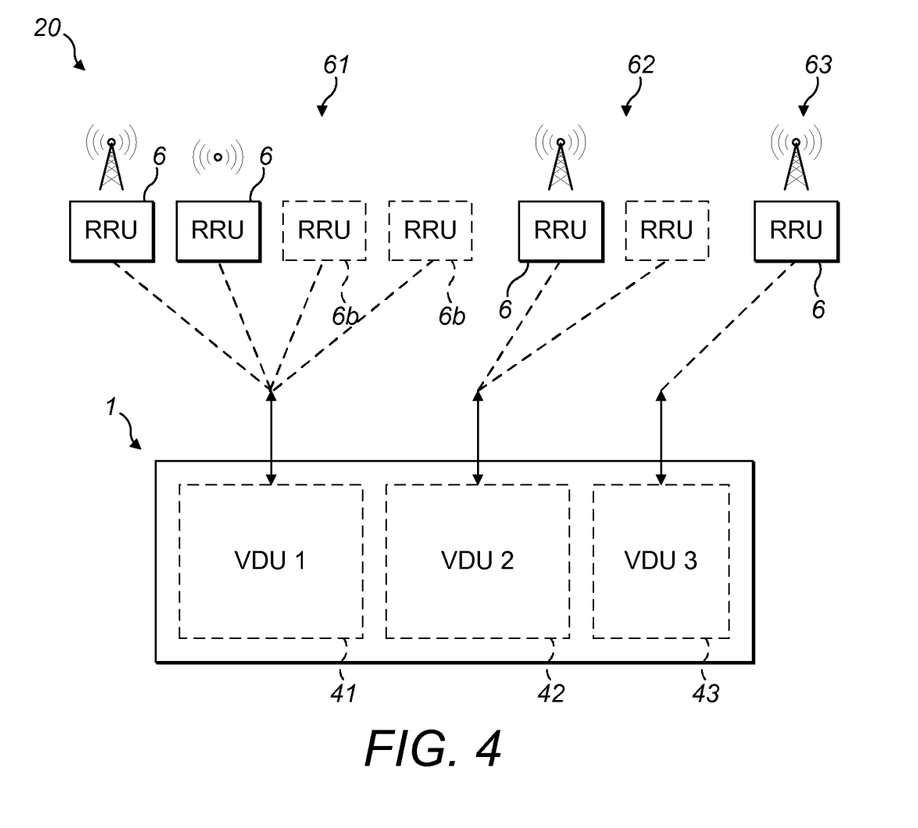
FIG. 4 is a schematic overview depicting a network according to a further example of the invention.
Figure 5:
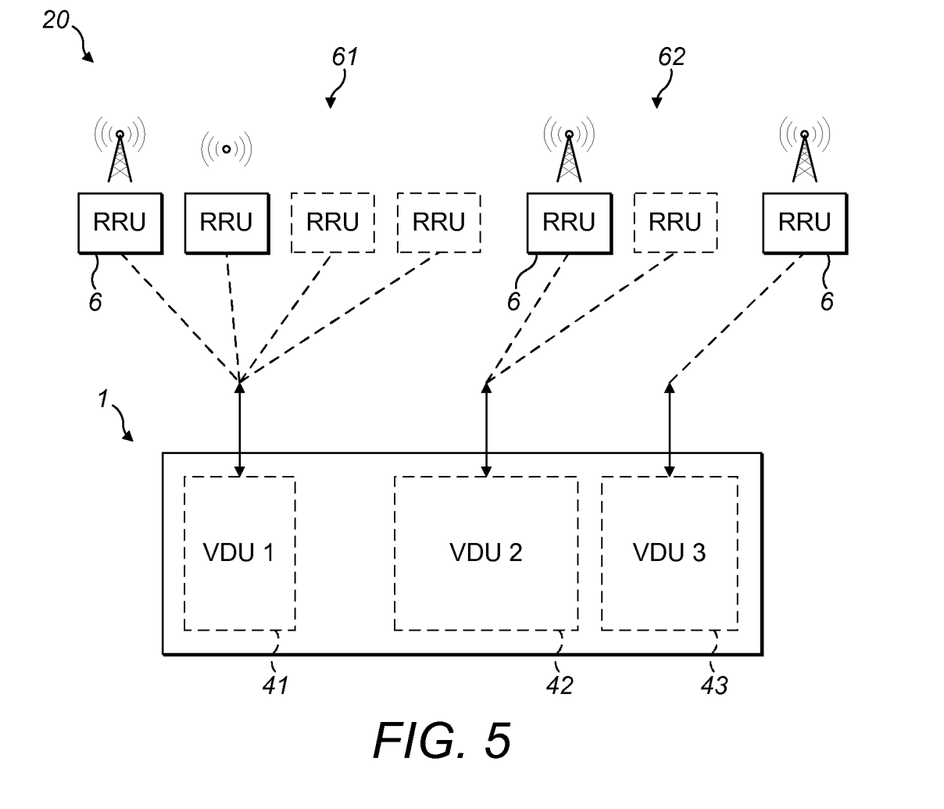
FIG. 5 is a schematic overview depicting a network according to a further example of the invention.
Figure 6:
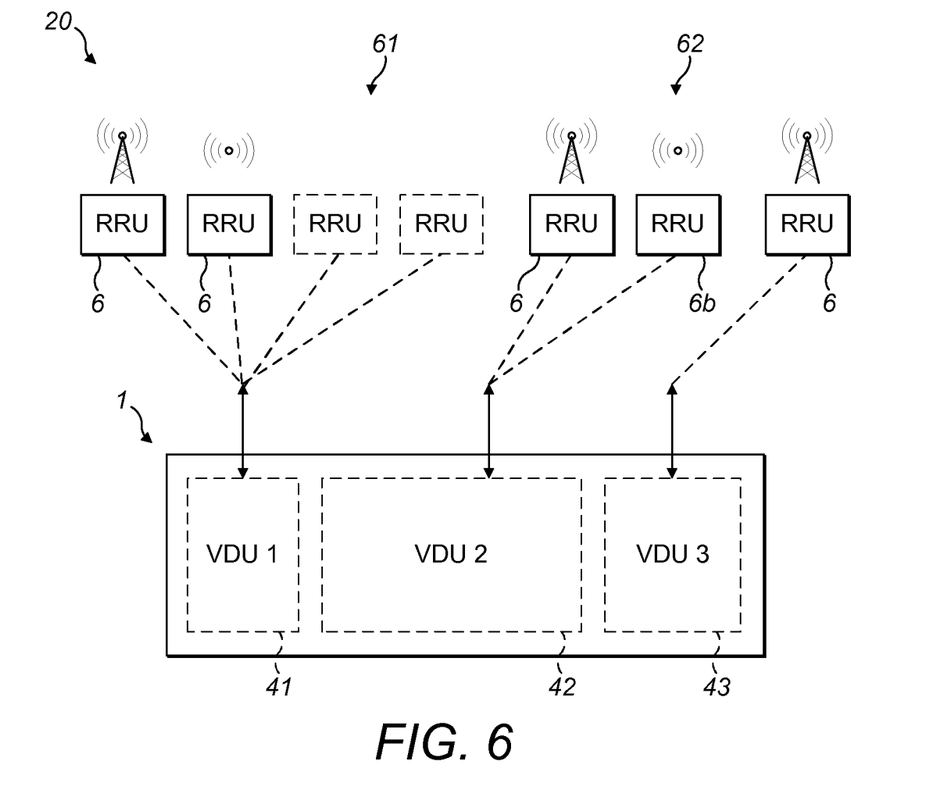
FIG. 6 is a schematic overview depicting a network according to a further example of the invention.

In some aspects, FIG. 3 depicts an example of an initial scenario, and exemplary changes are shown in FIGS. 4 to 6.

FIG. 4 shows the example network being 20 configured to handle different traffic demands. For example, FIG. 4 may relate to a different period of the day than handled by the configuration of FIG. 3. In FIG. 4, the traffic demand in the first area 61 has decreased (e.g. in the evening in a business zone). In this case, two of the three small cells provided by RRUs 6*b* are temporarily deactivated. FIG. 4 depicts this new situation. After the deactivation of the RRUs associated with the first VDU 41, the allocated computational capacity of the first VDU 41 is determined to be excessive, i.e. unused. A part of the capacity of the first VDU 41 (i.e. an unused capacity) may be released to one or more other VDUs 42,43 within the virtualization system. The release may occur as soon as it is required by another VDU.

In some aspects, the re-allocation of computational capacity between the VDUs is based on dynamic changes in the radio domain, for example, coordination, activation/deactivation of cells. The requirement to dimension the capacity of a conventional DU on a peak requirement is therefore removed. For example, one or more parameter corresponding to the radio domain requirements of the RRUs is used to re-allocate computational capacity between the VDUs.

The virtualization system 1 is configured to receive the one or more radio domain parameter, and base an allocation or re-allocation of processing capacity on the one or more radio domain parameter. Alternatively, a management system is configured to receive the one or more radio domain parameter, and transmit an indicator of allocation of processing capacity to the virtualization system 1. The radio domain parameter is received at intervals and/or in response to a change in the RRUs. This provides for the virtualization system to react to the change in the radio domain situation indicated by the one or more radio domain parameter. Thus, the virtualization system 1 is configured to dynamically re-allocate processing capacity according to the determined one or radio domain parameter. In some aspects, the re-allocation of processing capacity is carried out automatically, without manual intervention.

The estimation of the amount of baseband resources to be allocated to the RRU pools may be based on the one or more radio domain parameter, which may also be considered as a radio parameter. The radio domain parameter may be considered as related to expected or actual resource utilisation in the cells served by the RRUs. For example, the radio domain parameter corresponds to an amount of traffic handled, or estimated to be handled, by the one or more RRUs connected to a VDU. In some examples, the radio domain parameter may be based on the total of the parameters for each of the RRUs connected to the VDU. The parameter, related to resource utilisation in a single cell may for example be based on any one of, or a combination of: collected statistical baseband resource utilisation for this type of cell, number of user equipment in the cell, estimated or actual average or peak traffic load within the cell, number of antennas related to the cell, and level of coordination. In some aspects, the parameter may be considered as relating to statistical baseband resource utilisation for one or more remote radio units, number of user equipments served by one or more remote radio unit, estimated or actual average or peak traffic load handled by one or more remote radio unit, number of antennas related to a cell provided by one or more remote radio units, and level of coordination among the remote radio units.

The level of coordination desired among the RRUs in a pool determines the cumulative required baseband resource capability. Initially, such required capability can be estimated off line and then communicated to a management system. The management system can then determine the activation (or enlargement) of a VDU. The management system may be a separate entity to the virtualization system, or may be a part of the virtualization system 1. In some aspects, coordination needs are triggered by the radio parameter. In some examples, the level of coordination is a separate parameter to the radio parameter, on which the amount of allocated or re-allocated processing capacity is based.

FIG. 5 shows a further arrangement of the network 20, in which a traffic demand has increased in the second area 62. In this case, it is determined to activate the small cell 6*b* in the second area to support the increase of traffic.

The current computational capability of the second VDU 42 is considered to be not sufficient to handle also this new small cell. It is therefore determined to increase the capacity (i.e. processing capacity) of the second VDU 42. The first VDU 41, which is still over dimensioned, is dynamically re-adjusted to fit the new, reduced, baseband processing needs of the cells in the first area and to release computational resources. The amount of computational resources required by the second VDU 42 typically are generally not exactly the amount of resources that can be released from first VDU 41. The releasable computational resources may be more or less than the demand. If the demand by the second VDU 42 is higher, the released resources are not enough and further computational resources shall be taken from elsewhere. If the demand by the second VDU 42 is less, it is not required that all the unused first VDU 41 resources shall be released in response to the new requirements of the second VDU 42. In this case, only the required computational resources are released from the first VDU 41. The released computation resources are allocated to the second VDU 42, in order to allow the second VDU 42 to be enlarged.

FIG. 6 shows the additional activated RRU managed by the second VDU 2. Prior to activation of the small cell in the second area, the second VDU 42 computational capacity is increased to support the new traffic load.

As illustrated in this simple example, part of the computational capability of the virtualization system 1 is re-allocated between VDUs 41,42,43, for example, for different time periods. For example, processing capacity is dedicated to the first VDU 41 in a first time period and dedicated to the second VDU 42 in a different, second, time period. This would be not possible using conventional DUs, in which processing capacity is statically associated to a pool of RRUs.

The apparatus and method described may be used in combination with a transport and/or switching solution between the RRUs 6 and virtualization systems 1. The transport and/or switching solution provides for dynamic association of VDUs 41,42,43 and RRUs 6.

An aspect of the present invention provides a virtualization system comprising a baseband processing arrangement. The virtualization system is configured to provide a plurality of virtual machines, each virtual machine having an allocation of baseband processing capacity provided by the baseband processing arrangement for serving remote radio units. The virtualization system is configured to dynamically re-allocate baseband processing capacity between virtual machines based on at least one parameter related to radio domain requirements of the remote radio units.

The virtualization system is configured to de-allocate baseband processing capacity which is determined to be unused from one or more of the plurality of virtual machines. The virtualization system is configured to allocate the de-allocated baseband processing capacity to an existing or additional virtual machine.

The at least one radio parameter is based on one or more of: statistical baseband resource utilisation for one or more remote radio units, number of user equipments served by one or more remote radio unit, estimated average or peak traffic load handled by one or more remote radio unit, number of antennas related to a cell provided by one or more remote radio units, and level of coordination among the remote radio units. At least one of the virtual machines provides processing capacity for coordination of a plurality of coordinated remote radio units.

A virtualization system or VDU is configured to vary a level of coordination among the remote radio units served by an existing or additional virtual machine, such that a baseband processing capacity required by the virtual machine is within an available baseband processing capacity to be allocated to the virtual machine.

Figure 7A:
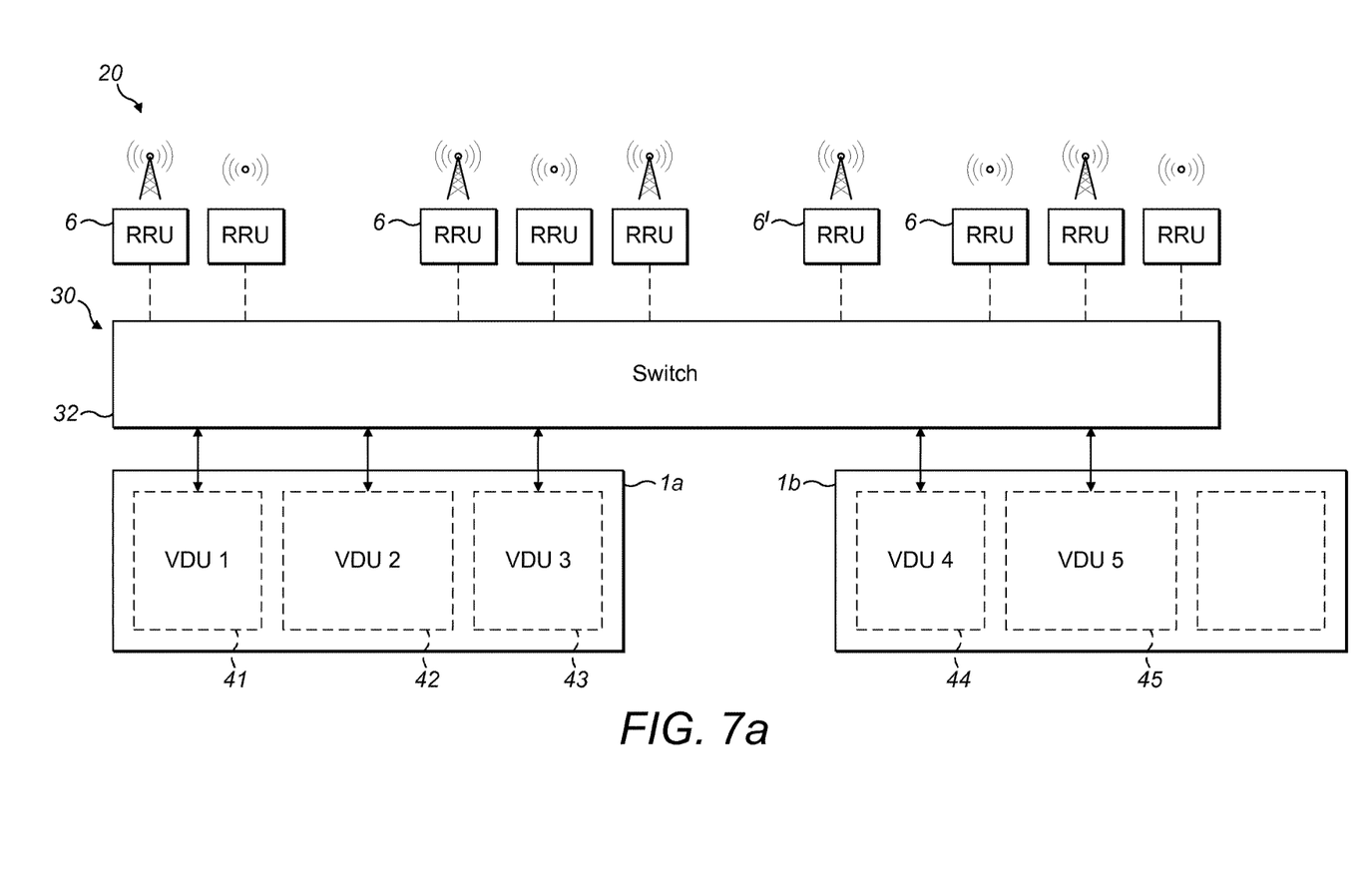
FIGS. 7a and 7b are schematic overviews depicting a network according to a further example of the invention.

FIG. 7a shows an example of a network 20 comprising a plurality of virtualization systems 1, in this case a first virtualization system 1a and a second virtualization system 1b. Each virtualization system is as described above, e.g. providing a plurality of VDUs. In this example, the first virtualization system 1a comprises VDUs 41,42,43 and the second virtualization system 1b comprises VDUs 44,45.

A plurality of RRUs 6 are connected to the first virtualization system 1a and second virtualization system 1b via a transport network 30, comprising a switch 32. The switch 32 provides a controllable selection of virtualization system 1a,1b which manages one or more RRUs. The switch 32 provides for a different VDU, for example a VDU of a same or different virtualization system, to manage the RRU.

Figure 7B:
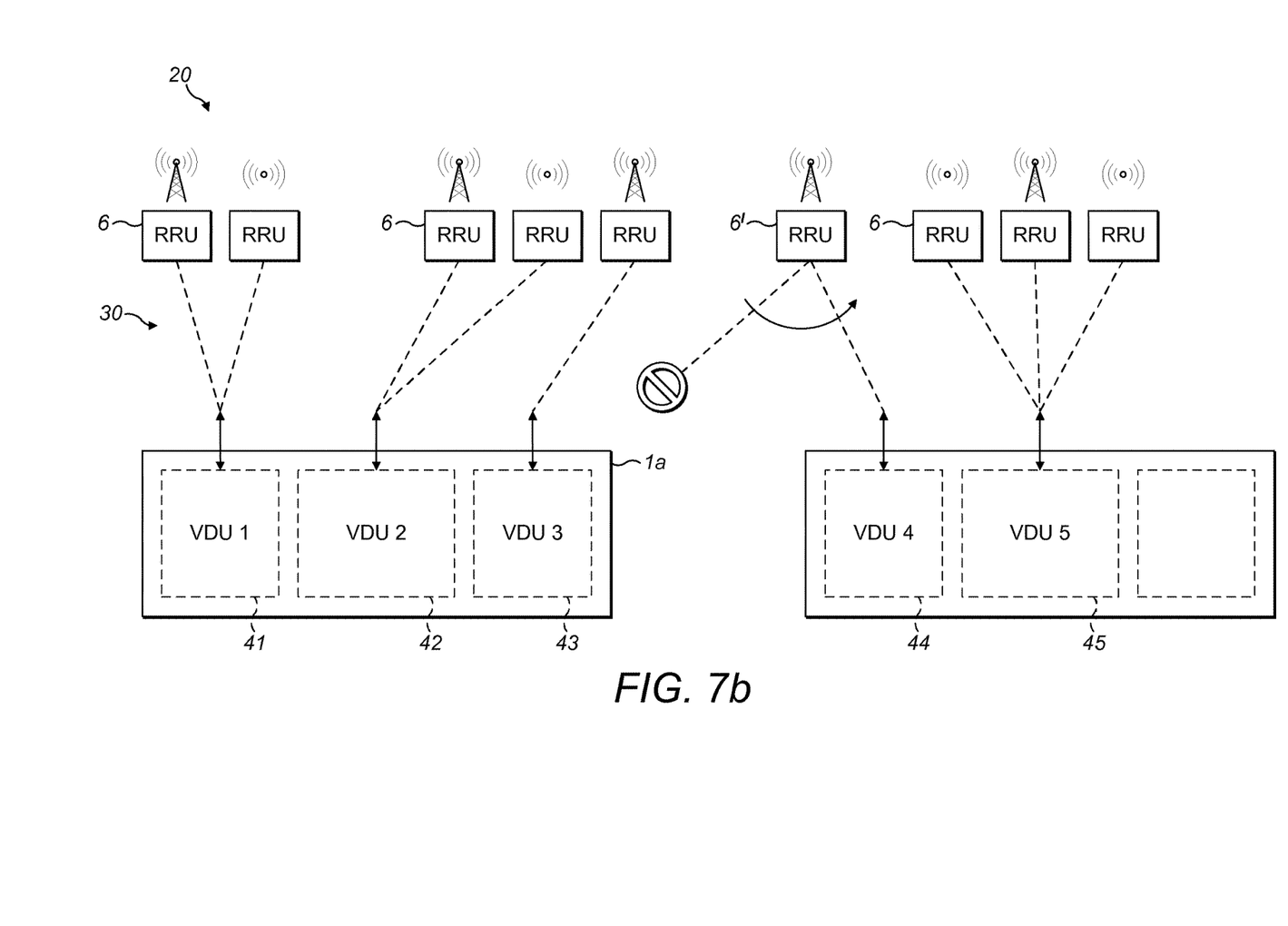

FIG. 7b shows an example of a change or selection of virtualization system connected to a particular RRU 6'. The network 20 is shown with the set up connections, without showing the switch 32.

For example, the first virtualization 1a system is determined not to have enough residual capability to accept a new RRU 6'. The second virtualization system 1b is determined to have sufficient capacity. The RRU 6' is connected by the transport network 30, e.g. including switch 32, to the second virtualization system 1b. The RRU 6' is supported by VDU 44.

In an example where the first virtualization system 1a is no longer able to serve the RRU 6', the RRU 6' can be served by the second virtualization system 1b by switching the physical connection from the first virtualization system 1a to the second virtualization system 1b. This logical change corresponds to a change in an output port of the switch 32 towards the virtualization systems 1a,1b.

An aspect of the invention relates to a network comprising one or more virtualization system and a plurality of remote radio units. The or each virtualization system comprises a baseband processing arrangement. The virtualization system is configured to provide a plurality of virtual machines, each having an allocation of baseband processing capacity provided by the baseband processing arrangement for serving the remote radio units. The network is configured to dynamically re-allocate baseband processing capacity between virtual machines based on at least one parameter related to radio domain requirements of the remote radio units.

In some examples, the network is a heterogeneous network, wherein the remote radio units provide a plurality of different size cells.

In some examples, the network comprises a plurality of virtualization systems, and the network further comprises a transport network between the virtualization systems and remote radio units. The transport network is configured to change a said virtualization system of the plurality of virtualization systems which is connected to a remote radio unit.

In some examples, the network is configured to de-allocate baseband processing capacity which is unused from one or more of the plurality of virtual machines, and the network is configured to allocate the de-allocated baseband processing capacity to an existing or additional virtual machine.

In some examples, the virtualization system is configured to vary a level of coordination among the remote radio units served by an existing or additional virtual machine, such that a processing capacity required by the virtual machine is within an available baseband processing capacity to be allocated to the virtual machine.

Figure 8:
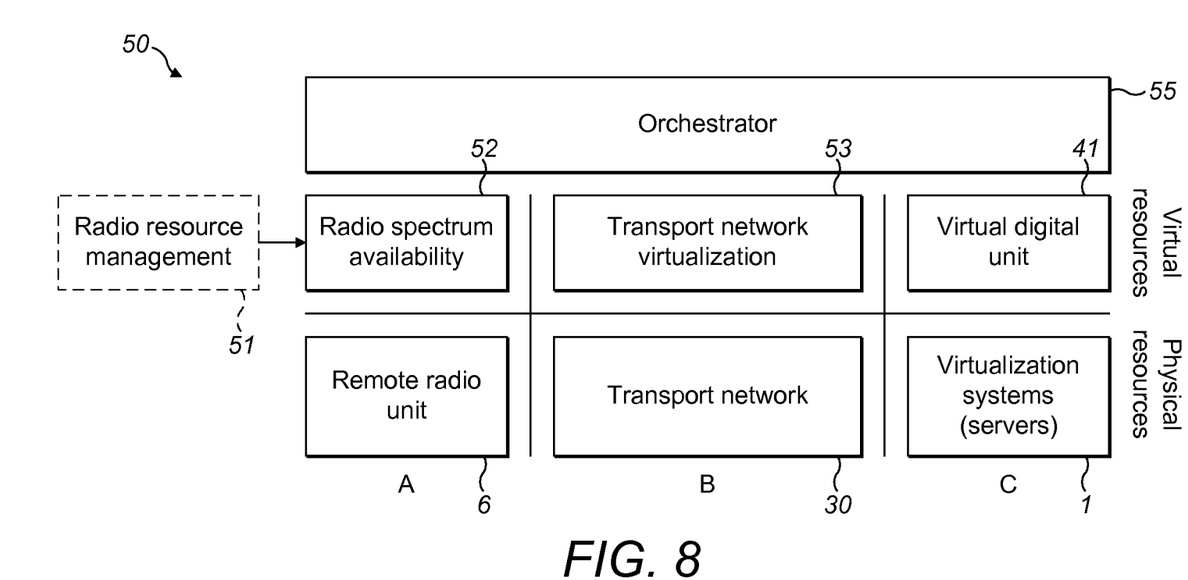
FIG. 8 is a schematic overview depicting virtualization according to a further example of the invention.

FIG. 8 shows a schematic view of the areas of the network impacted by aspects of the invention.

Aspects of the invention relate to Network Function Virtualization. The arrangement provides for optimization opportunities. The proposed arrangement and method aims at optimizing one or more of different types of resources. Aspects of the invention provide a fronthaul NFV arrangement. A common entity, acting as an orchestrator 55, could lead said joint resource optimization. One or more of the following types of resources may be optimized by examples of the invention:

A) Spectrum in air, which usage is more or less efficient depending on the level of coordination among the cells covering a common area. A radio spectrum availability 52 is a virtual resource for a physical remote radio unit 6, as controlled by radio resource management 51.

B) Transport and switching resources (nodes and links connecting virtualization systems). A transport network virtualization 53 is associated with the transport network 30.

C) Hardware resources of servers (processor, storage, memory) and their usage and power consumption over time to provide VDUs. A virtual digital unit 41 is implemented on a server, i.e. virtualization system 1.

Figure 9:
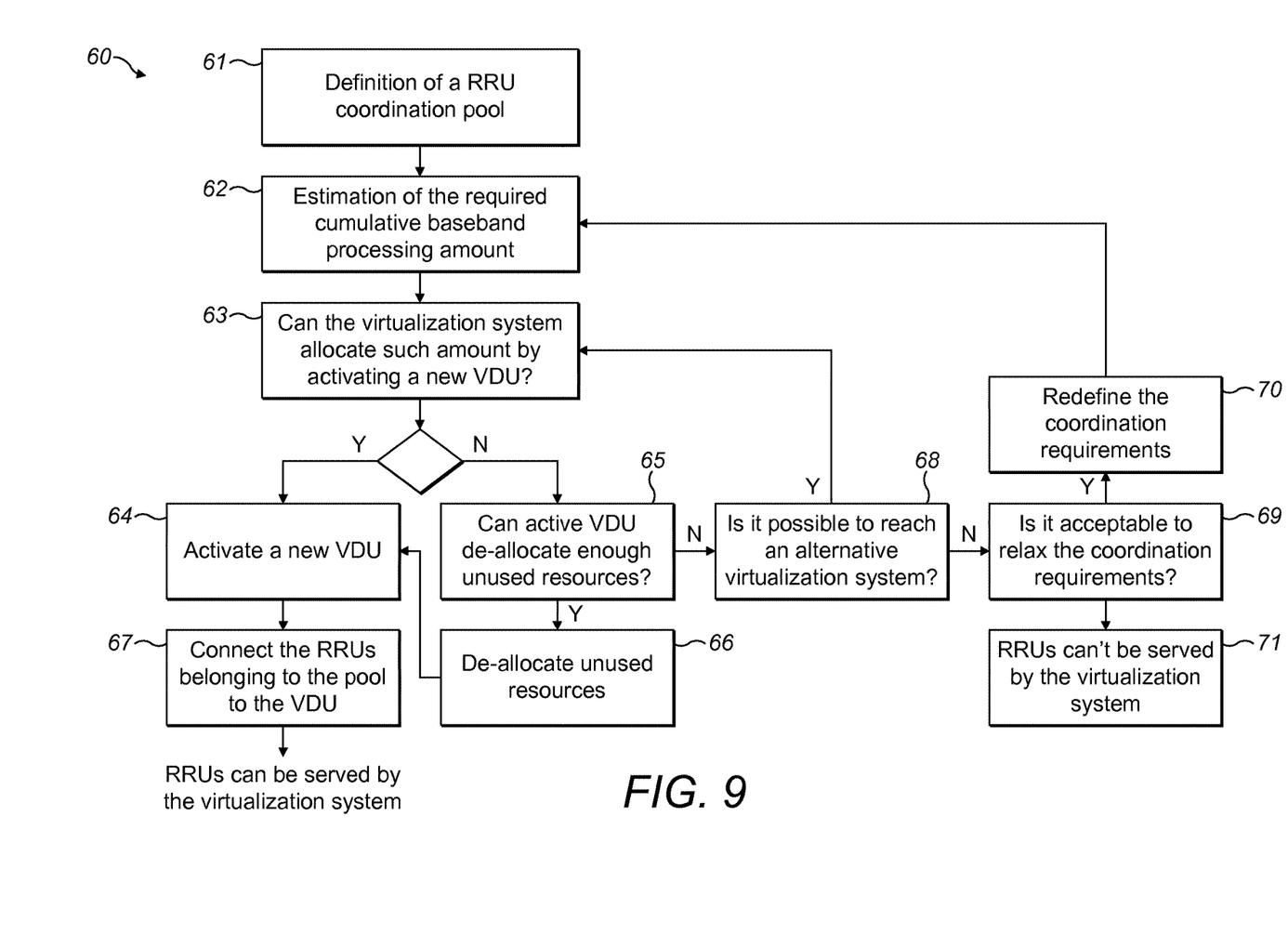
FIG. 9 is a schematic overview depicting a method according to a further example of the invention.

In some aspects, for example in the method described with respect to FIG. 9, priority is given to providing the best possible coordination level (spectrum usage efficiency and interference mitigation at cell edges). This is because spectrum in air cannot be increased over the physical limits, and so may be the scarcest resource.

Relaxing the coordination requirements is implemented as a final option. Transport and switching resources between the RRU and virtualization systems are changed only if it is not possible to handle the baseband processing of the new RRUs at the virtualization system level. However, priority in the use of resources of types A, B and C could be different according, for example, to cost of using physical resources and operator policies.

FIG. 9 illustrates an example of a method 60 to allocate baseband processing computational instances in a VDU 41 to one or more RRUs 6. The virtualization system 1 and VDU 41 is arranged according to any example, for example, as shown in FIG. 2. The example shows an addition of a new pool of RRUs.

In 61, there is a definition of a RRU coordination pool. This step has the purpose to define a set of RRU which traffic shall have a common baseband processing to ensure tight coordination among the cells associated with said set of RRUs. This step relates identifying and connecting to the virtualization system 1, for the first time, a set of new RRUs, e.g. which are mutually correlated by the need of a shared processing. The new pool of coordinated RRUs shall be served by the virtualization system 1. This requires activation of a new VDU for the pool.

In 62, there is an estimation of the required cumulative baseband processing amount. At this step, it is estimated the cumulative amount of computational resources needed to serve said set of RRUs 6. The estimated amount in 62 relates to the new VDU only.

This can be triggered by the number of connected devices, by the portion of such devices at cell edge and by the need of more sophisticated ways to manage interference, e.g. adaptive Reduced Power Subframes (RPS) or Cooperative MultiPoint (CoMP). The cumulative amount can vary over time, so this value may be expressed as a function of time.

In 63, it is determined if the virtualization system can allocate the determined amount of baseband processing capacity by activating a new VDU. At this step, the capability of the virtualization system to provide the required computational resources by activating a new VDU is verified. The baseband processing capacity is the amount dedicated to the set of RRUs.

If the decision in 63 is Yes (allocation is possible), a new VDU is activated in step 64, and the available processing capacity is allocated to the new VDU. A set of RRUs is connected to the VDU in 67. If a switch 32 is located between the RRUs and virtualization system, the switch is configured to switch CPRI traffic from the RRUs to the VDU.

If the decision in 63 is No (allocation is not possible), the VDUs currently active in the virtualization systems are scanned to verify if resources can be freed from the VDUs. In 65, a determination is made of whether a cumulative amount of such unused resources is sufficient to provide enough computational effort to activate the new requested VDU. If sufficient resources are available, then at least part of these unused resources are de-allocated in step 66. The amount of resources which is de-allocated is equal to the required amount of resources of the new VDU, and not the full amount of resources which are determined to not be used. Then, a new VDU is activated in step 64 and the set of RRUs is attached to the new VDU.

In 67, after a new VDU is activated, the one or more RRUs of the pool are connected to the VDU.

If the determination in 65 is negative (enough unused resources cannot be de-allocated), then a determination is made in 68 regarding the ability of the RRU to be connected with an alternative virtualization system, for example using the transport and switching network 30 (e.g. switch 32) to connect to an alternative virtualization system. This would bring the CPRI traffic to an alternative virtualization system. In other words, the CPRI traffic generated by the RRU pool could be diverted towards another virtualization system having more available computational capabilities. An example of this is illustrated in FIGS. 7a and 7b.

If the determination in 68 is that it is possible to reach an alternative virtualization system, then the method is repeated from step 63 for the alternative virtualization system.

If the determination in 68 is that it is not possible to reach an alternative virtualization system, then a determination is made in 69 on whether it is acceptable to relax the coordination requirements, i.e. reduce the level of coordination. A reduced coordination level means a reduction of the baseband processing needs. By relaxing the coordination level, the bandwidth exploitation efficiency will be reduced.

If the level of coordination can be reduced, then the co-ordination requirements are redefined in 70. The method is then repeated from step 62 for the redefined requirements. If the coordination requirements cannot be relaxed, then a decision is generated in 71 that the RRUs cannot be served by the virtualization system.

In alternative examples, the addition or (re-)activation of a new RRU to an existing pool or the deactivation of a RRU is made. In this case, a determination on enlarging the processing capacity allocated to an existing VDU is made, without adding an additional VDU. As described above, a determination is made on whether another VDU in the virtualization system has unused resources which can be de-allocated. If so, unused resources are de-allocated, and re-allocated to the existing VDU which is serving the additional or (re)activated RRU.

An aspect of the invention relates to a method of operating a virtualization system comprising a baseband processing arrangement. The method comprising providing a plurality of virtual machines, each having an allocation of baseband processing capacity provided by the baseband processing arrangement for serving remote radio units. The method further comprising dynamically re-allocating the processing capacity between virtual machines based on at least one parameter related to radio domain requirements of the remote radio units.

In some examples, the method comprises de-allocating baseband processing capacity which is determined to be unused from one or more of the plurality of virtual machines, and allocating the de-allocated baseband processing capacity to an existing or additional virtual machine.

In some examples, the method comprises determining if a remote radio unit can be served by a different one of a plurality of virtualization systems, and if so, determining if the different virtualization system is able to allocate an estimated amount of baseband processing capacity by activating a new virtual machine or allocating further baseband processing capacity to an existing virtual machine.

In some examples, the method comprises determining if a level of coordination among the remote radio units served by an existing or additional virtual machine can be reduced, and if so, determining if the virtualization system has available baseband processing capacity to allocate to the virtual machine.

In some examples, coordination between RRUs is only for RRUs served by the same VDU. In a further example, coordination of RRUs is between RRUs belonging to different VDUs, in the same virtualization system. This requires I/O communication among virtual connections between the VDUs.

In some aspects, the VDU may have a computational capacity which is adjustable to fit the evolving traffic and coordination needs. This provides for flexibility of the RRUs attached to a particular VDU for which coordination is required and/or flexibility in the computational resources allocated to a group of coordinated RRUs sharing a VDU. This is in contrast to the conventional DU, which is dimensioned for the peak of baseband processing required for coordination of a given set of RRUs.

In some aspects, once a VDU has been activated, the VDU keeps all its nominal computational capability. This is the case, even if later, the computational capability becomes partially unused, for example because some small cells have been temporarily deactivated. The unused resources are released only when needed for other purposes, for example to enable the activation of a new or enlarged VDU. A continuous re-dimensioning of the VDUs, to track in real time the evolving processing needs, may result in system instability.

A new RRU 6 may be added to an existing VDU, without implementing a new VDU. For example, if a VDU is serving a set of RRUs, a new coordinated RRU ("plug & play") may be attached by increasing the computational capability of the VDU, prior to including the new RRU to the set.

In some examples, a configuration of VDUs is cached. In order to speed up the activation of specific VDUs, for example for a well-defined set of RRUs which are all active during business hours in a specific area, images of the VDUs configuration are cached. VDU provisioning becomes faster because its image is searched for in an image repository and transferred to the processing area for immediate activation of the VDU instance. This is followed by attaching of RRUs to the port(s) and finally allocating the expected and planned baseband processing capability to the RRUs. The use of configuration image caching reduces server requirements by preparing the VDU instance with static parameters, when possible. In more challenging cloud scenarios, configuration images could be transferred among different servers for load balancing and recovery purposes. This is carried out in a corresponding process to a migration of virtual machines among data centers.

Aspects of the invention provide for shared networks. The arrangement provides a practical implementation of the sharing of hardware resources among multiple operators. Virtual digital units, serving traffic belonging to different operators, can be activated on the same server enabling the sharing of hardware operation, maintenance and safety features. Aspects of the invention relate to dynamically allocating an amount of computational capability in a virtualization system (server) to the task of baseband processing of traffic generated by a set of RRUs. In some examples, the RRUs are grouped in coordinated pools.

Aspects of the invention provide for an optimized use of hardware resources (processor and memory, in particular) by utilizing virtualization to provide virtualized digital units. A plurality of VDUs, each having the functionality of a digital unit, are configured within a virtualization system.

Aspects of the invention use network virtualization applied to a heterogeneous network. Examples of the invention may provide one or more of the following advantages. Aspects of the invention provide for improved management of dynamic traffic trends, especially in heterogeneous networks. Fluctuation of traffic with time and spatial position can be handled by activating, deactivating, modifying virtual computational entities instead of using fixed hardware at a proportion of its maximum performance.

Aspects of the invention provide for addition of new radio units (RRUs) is facilitated, particular when the RRUs require coordination with existing radio units. Typical examples are macro cell densification scenarios, and addition of small cells which are coordinated with a macro cell for optimized performance.

Aspects of the invention provide for reduced equipment costs and reduced power consumption, since the hardware associated with a VDU can be dimensioned on average processing loads instead of on peak loads.

Aspects of the invention provide for improved introduction of new services by software upgrades. Service provisioning is improved by remotely feeding software without any site visits required to install new hardware. In some examples, there is an initial over dimensioning of hardware to be ready for future upgrades and needs.

Aspects of the invention provide for reduction of risk in introducing new services: hardware resources can be reconfigured if the new services do not meet expected targets and are discontinued. Aspects of the invention provide for reduced complexity in multi-operator, shared networks, scenarios. Specific virtual processing entities can be activated on an operator basis, allocating computational slices to multiple operators on shared hardware. This allows simplifying installation, management, security, and sharing the investments among operators.

Examples provide for temporarily managing failures by moving affected network workloads onto spare capacity using IT orchestration mechanisms, as an alternative to network recovery schemes. This could be useful to mitigate the effect of network failures and to gain more time to repair.

In some examples, the RRU may alternatively be termed Radio Equipment (RE). In some examples, the DU may alternatively be termed a Main unit (MU), Radio Equipment Controller (REC) or Baseband Unit (BBU).

In some examples, the virtualization system or method uses a computer program code for performing the functions and/or method steps of the embodiments herein. The program code mentioned may be provided as a computer program product, for instance in the form of a data carrier carrying computer program code for performing embodiments herein when being loaded into the control unit. One such carrier may be in the form of a CD ROM disc. It is however feasible with other data carriers such as a memory stick. The computer program code may furthermore be provided as pure program code on a server and downloaded.

Those skilled in the art will also appreciate that various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Aspects of the invention relate to an allocation of processing capacity based on one or more radio parameters. This provides for a setting or a change in processing capacity in response to a change in one or more radio parameters. In some aspects, the allocation is a dynamic re-allocation, based on a received radio domain parameter (including level of coordination). Such re-allocation (including activating a new VDU) occurs periodically and/or when triggered by an event, e.g. addition or removal of one or more RRU, or a radio parameter (e.g. traffic load) crossing a threshold. The re-allocation may be considered to also include an initial allocation of processing capacity based on a radio parameter. The re-allocation may be considered to also include an allocation to a new virtual machine which is activated to handle one or more additional or (re) activated RRUs. The same steps and features are applicable for setting up a new VDU or attaching a new RRU to an existing VDU, i.e. de-allocate unused processing capacity and allocate to create a new VDU or enlarged VDU.

Aspects of the invention have been described as re-allocating processing capacity based on a radio parameter. Alternatively, the re-allocating of processing capacity is not based on a radio parameter. The re-allocation may be based on a different type of parameter or manual configuration.

Any feature described or claimed may be present in relation to any example of the invention, for example, as defined in relation to a virtualization system, digital unit, VDU, virtual machine, network or method step, carried out in any apparatus, e.g. virtualization system, digital unit, VDU, virtual machine or network.

The invention claimed is:

1. A virtualization system comprising a baseband processing arrangement,
   wherein the virtualization system is configured to provide a plurality of virtual machines, each virtual machine having an allocation of baseband processing capacity provided by the baseband processing arrangement for serving remote radio units,
   wherein the virtualization system is configured to dynamically re-allocate baseband processing capacity between virtual machines based on at least one parameter related to radio domain requirements of the remote radio units,
   wherein the virtualization system is configured to reduce a level of coordination among the remote radio units served by an existing or additional virtual machine, such that a baseband processing capacity required by the virtual machine is within an available baseband processing capacity to be allocated to the virtual machine, wherein reduced coordination level means a reduction of baseband processing needs, and
   wherein the virtualization system is configured to de-allocate baseband processing capacity which is determined to be unused from one or more of the plurality of virtual machines, and the virtualization system is configured to allocate the de-allocated baseband processing capacity to an existing or additional virtual machine.

2. The virtualization system as claimed in claim 1 wherein the at least one parameter is based on one or more of: statistical baseband resource utilization for one or more remote radio units, number of user equipments served by one or more remote radio unit, estimated average or peak traffic load handled by one or more remote radio unit, number of antennas related to a cell provided by one or more remote radio units, and level of coordination among the remote radio units.

3. The virtualization system as claimed in claim 1 wherein at least one of the virtual machines provides processing capacity for coordination of a plurality of coordinated remote radio units.

4. The digital unit as claimed in claim 1 configured to provide baseband processing capacity for coordination of a plurality of coordinated remote radio units.

5. A network comprising one or more virtualization system and a plurality of remote radio units,
   wherein the or each virtualization system comprises a baseband processing arrangement, wherein the virtualization system is configured to provide a plurality of virtual machines, each having an allocation of baseband processing capacity provided by the baseband processing arrangement for serving the remote radio units,
   wherein the network is configured to dynamically re-allocate baseband processing capacity between virtual machines based on at least one parameter related to radio domain requirements of the remote radio units,
   wherein the virtualization system is configured to reduce a level of coordination among the remote radio units served by an existing or additional virtual machine, such that a processing capacity required by the virtual machine is within an available baseband processing capacity to be allocated to the virtual machine, wherein a reduced coordination level means a reduction of baseband processing needs,
   wherein the network is configured to de-allocate baseband processing capacity which is unused from one or more of the plurality of virtual machines, and
   the network is configured to allocate the de-allocated baseband processing capacity to an existing or additional virtual machine.

6. The network as claimed in claim 5 wherein the network is a heterogeneous network, wherein the remote radio units provide a plurality of different size cells.

7. The network as claimed in claim 5 wherein the network comprises a plurality of virtualization systems, and
   the network further comprises a transport network between the virtualization systems and remote radio units, and
   wherein the transport network is configured to change a said virtualization system of the plurality of virtualization systems which is connected to a remote radio unit.

8. A method of operating a virtualization system comprising a baseband processing arrangement, the method comprising:
   providing a plurality of virtual machines, each having an allocation of baseband processing capacity provided by the baseband processing arrangement for serving remote radio units,
   dynamically re-allocating the processing capacity between virtual machines based on at least one parameter related to radio domain requirements of the remote radio units, and determining if a level of coordination among the remote radio units served by an existing or additional virtual machine can be reduced, and if so, determining if the virtualization system has available baseband processing capacity to allocate to the virtual machine, wherein a reduced coordination level means a reduction of baseband processing needs,
   de-allocating baseband processing capacity which is determined to be unused from one or more of the plurality of virtual machines, and
   allocating the de-allocated baseband processing capacity to an existing or additional virtual machine.

9. The method as claimed in claim 8 further comprising:
   determining if a remote radio unit can be served by a different one of a plurality of virtualization systems, and if so, determining if the different virtualization system is able to allocate an estimated amount of baseband processing capacity by activating a new virtual machine or allocating further baseband processing capacity to an existing virtual machine.

10. The method as claimed in claim 8, wherein the at least one parameter is based on one or more of: statistical baseband resource utilization for one or more remote radio units, number of user equipments served by one or more remote radio unit, estimated average or peak traffic load handled by one or more remote radio unit, number of antennas related to a cell provided by one or more remote radio units, and level of coordination among the remote radio units.

* * * * *